Patented Mar. 14, 1950

2,500,652

UNITED STATES PATENT OFFICE 2,500,652

PRODUCTION OF DIMETHYLTOLYL-CHLOROSILANE

Arthur J. Barry and John W. Gilkey, Midland, Mich., assignors to Dow Corning Corporation, Midland, Mich., a corporation of Michigan No Drawing. Application June 27, 1949, Serial No. 101,684. In Great Britain August 3, 1948

1 Claim. (Cl. 260—448.2)

The present invention relates to the production of organosilicon halides and in particular to the production of organosilanes which contain three organic radicals linked to the silicon atom by carbon to silicon bonds and one chlorine atom linked to the silicon atom.

In accordance with the present invention trimethylchlorosilane is reacted with toluene. The reaction is conducted at a temperature above 300° C. at a pressure sufficient that at least some of the reactant mixture is in a condensed phase and in the presence of a boron or aluminum halide.

Trimethylchlorosilane is a material now well known in the industry and is commercially available.

The reactants interact in equimolecular proportions with the replacement of one methyl radical on the trimethylchlorosilane with a tolyl radical, the silicon atom being bonded directly to the aryl ring. Thus, the product which is obtained is dimethyltolylchlorosilane.

The reactants are heated in mixture with the boron or aluminum halide, the latter preferably being in proportion between about .1% and 10%. The halides preferably employed are aluminum chloride or fluoride, or boron chloride or fluoride. If desired, hydrogen fluoride or hydrogen chloride may likewise be added.

The reaction is conducted at a temperature above 300° C. and preferably at a temperature below 500° C. and at a pressure sufficient that there is at least some condensed phase present. This may be in some instances a true liquid phase and in others it may be a condensed phase, such as is obtained at high temperature and high pressures. Present general technical knowledge with respect to such condensed phases, which are not true liquid phases, is relatively limited.

Example I

A mixture was prepared of 276 grams of toluene and 326 grams of trimethylchlorosilane. This mixture was placed in a 2.4 liter bomb together with 9 grams of boron trichloride. The bomb pressure at that time was atmospheric pressure. The bomb was maintained for 16 hours at a temperature range from 398° to 406° C. After the bomb was brought to this temperature range, the pressure was 1250 pounds per square inch. This pressure increased to 1380 pounds per square inch during the course of the heating period. The bomb was then cooled to room temperature at which time the residual pressure was 150 pounds per square inch.

The contents of the bomb were discharged whereby there was obtained 566 grams of a liquid product. 561 grams of this product were placed in a still. Upon distillation, a product was obtained which was principally tolyldimethylchlorosilane which product has a boiling point of 110° to 114° C. at 30 mm. pressure and a specific gravity of 1.133 at 20.4° C.

Example II

A mixture of 276 grams of toluene, 326 grams of trimethylchlorosilane and 5 grams of aluminum chloride was heated for 16 hours in a bomb of 2.4 liter capacity at 400° C. The mixture was discharged and distilled. Tolyldimethylchlorosilane was obtained.

Example III

The process of Example II was repeated employing 552 grams of toluene, 326 grams of trimethylchlorosilane and 9 grams of aluminum chloride. Upon distillation, tolyldimethylchlorosilane was obtained.

That which is claimed is:

The method of preparing tolyldimethylchlorosilane which comprises reacting toluene and trimethylchlorosilane at a temperature between 300° C. and 500° C. in mixture with a halide of a metal of the group consisting of aluminum and boron, at least a portion of the reactants being in a condensed phase.

ARTHUR J. BARRY.
JOHN W. GILKEY.

No references cited.